(12) United States Patent
Rajendran et al.

(10) Patent No.: US 12,389,378 B2
(45) Date of Patent: Aug. 12, 2025

(54) SSB TRANSMISSION FOR IMPROVING LOW SINR ACROSS NETWORK

(71) Applicant: DISH Wireless L.L.C., Englewood, CO (US)

(72) Inventors: Karupaiah Rajendran, Highlands Ranch, CO (US); Norberto Amaya, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 436 days.

(21) Appl. No.: 17/886,157

(22) Filed: Aug. 11, 2022

(65) Prior Publication Data
US 2024/0057041 A1 Feb. 15, 2024

(51) Int. Cl.
*H04W 72/04* (2023.01)
*H04W 48/08* (2009.01)
*H04W 72/044* (2023.01)
*H04W 72/23* (2023.01)

(52) U.S. Cl.
CPC ......... *H04W 72/044* (2013.01); *H04W 48/08* (2013.01); *H04W 72/23* (2023.01)

(58) Field of Classification Search
CPC ........... H04W 72/044; H04W 72/0453; H04W 48/08; H04W 56/001; H04W 72/23
USPC .......................................................... 370/329
See application file for complete search history.

(56) References Cited

U.S. PATENT DOCUMENTS

| | | | | |
|---|---|---|---|---|
| 10,305,580 | B1 * | 5/2019 | Lee | H04L 25/03343 |
| 2022/0210844 | A1 * | 6/2022 | MolavianJazi | H04W 74/006 |
| 2022/0256487 | A1 * | 8/2022 | Liu | H04W 56/001 |
| 2023/0275628 | A1 * | 8/2023 | Ge | H04B 1/401 375/262 |
| 2023/0388900 | A1 * | 11/2023 | Sakhnini | H04W 56/001 |
| 2023/0422310 | A1 * | 12/2023 | Kim | H04W 72/0453 |

OTHER PUBLICATIONS

International Search Report and Written Opinion, dated Jan. 9, 2024, for International Patent Application No. PCT/US2023/029764. (20 pages).
3GPP Technical Specification Group Radio Access Network; 3GPP TS 38.211 V17.2.0; 2022; 136 pages.
3GPP Technical Specification Group Radio Access Network; 3GPP TS 38.213 V17.2.0; 2022; 256 pages.
Invitation to Pay Additional Fees, dated Nov. 10, 2023, for International Patent Application No. PCT/US2023/029764. (16 pages).

* cited by examiner

*Primary Examiner* — Jungwon Chang
(74) *Attorney, Agent, or Firm* — Seed IP Law Group LLP

(57) ABSTRACT

Disclosed is a method of transmitting Synchronization Signal Blocks (SSBs) in a Fifth-Generation (5G) New Radio (NR) cellular telecommunication Radio Access Network (RAN). The method is performed by a Radio Unit (RU) device and includes: transmitting first symbols from a first antenna in a first sector, two or more of the first symbols including a first SSB; transmitting second symbols from a second antenna in a second sector, two or more of the second symbols including a second SSB; and transmitting third symbols from a third antenna in a third sector, two or more of the third symbols including a third SSB. The transmitting is performed during a first time slot and a second time slot. The symbols including the first SSB, the symbols including the second SSB, and the symbols including the third SSB are transmitted during different time periods.

12 Claims, 8 Drawing Sheets

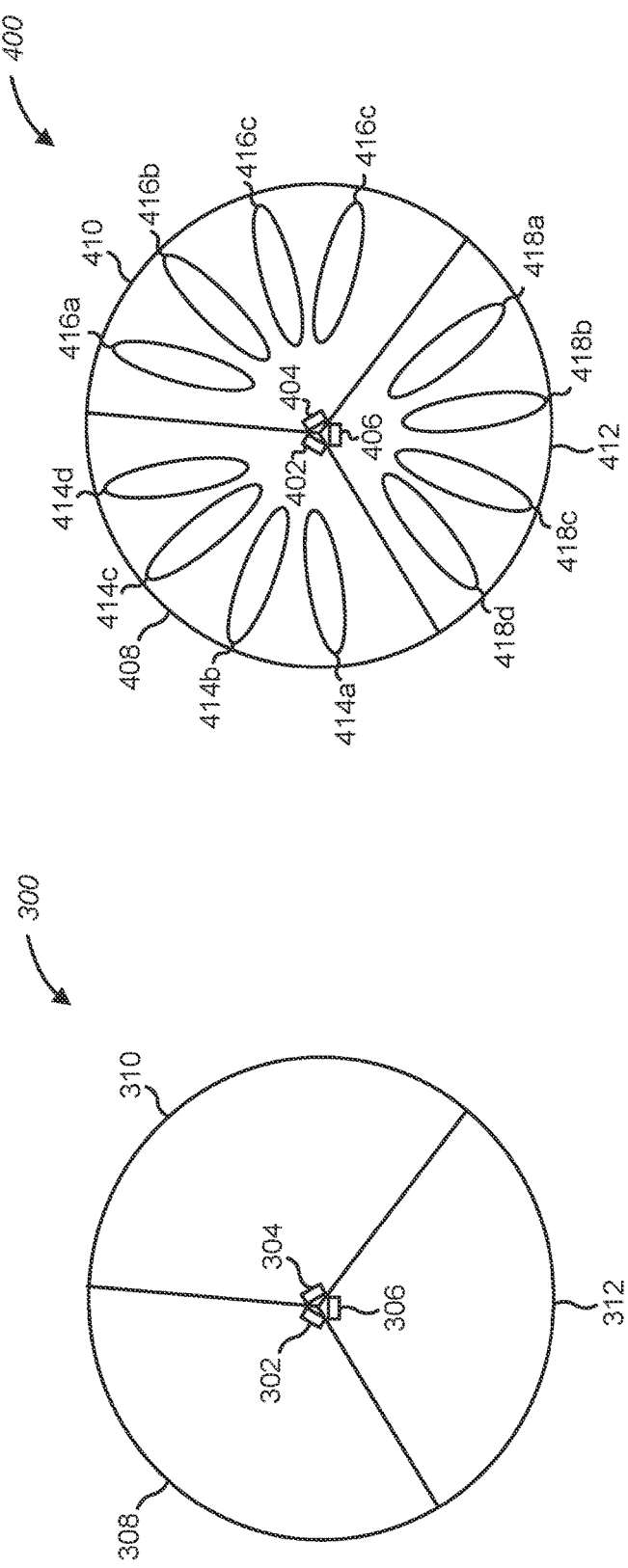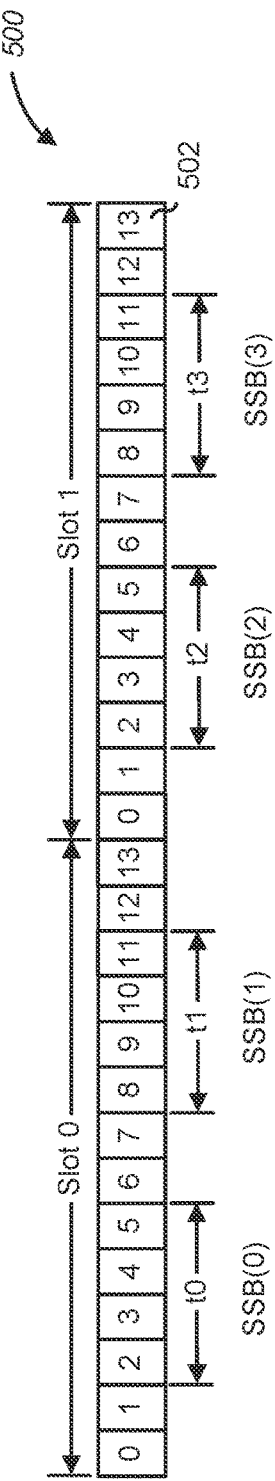

SSB TRANSMISSION FOR IMPROVING LOW SINR ACROSS NETWORK

BACKGROUND

Synchronization Signal Blocks (SSBs) are used in Fifth Generation (5G) New Radio (NR) cellular telecommunication Radio Access Networks (RANs). An SSB occupies 240 subcarriers in the frequency domain and 4 symbols in the time domain. An SSB contains a Primary Synchronization Signal (PSS), a Secondary Synchronization Signal (SSS), and a Physical Broadcast Channel (PBCH). The PSS and SSS represent a Physical Cell Identity (PCI), and the PBCH carries a Master Information Block (MIB). SSBs are transmitted periodically from each cell in a cellular network. SSBs are transmitted by Radio Unit (RU) devices, which are served by a Distributed Unit (DU) device that is governed by a Central Unit (CU) device and can be configured with a periodicity of 5 ms to 160 ms (e.g., 5 ms, 10 ms, 20 ms, 40 ms, 80 ms, 160 ms).

Conventionally, when beamforming is not used, SSBs are transmitted on different cells using the same time and frequency resources. Therefore, there is a 100% probability of mutual SSB interference from adjacent cells in areas where coverage for those cells overlap. Thus, due to this interference the Signal to Noise Ratio (SNR) of the SSB signal that is received at a User Equipment (UE) device may degrade significantly in regions with coverage overlap from adjacent cells.

BRIEF SUMMARY

According to the present disclosure, transmission of SSBs from adjacent cells is shifted in the time domain or in the frequency domain or in both time and frequency domains. When SSBs from adjacent cells are transmitted at different time slots using frequency resources that do not overlap or minimally overlap, there is a reduction of SSB-to-SSB interference, which results in an increased Signal to Interference Noise Ratio (SINR) at a UE device that is in a location where coverage areas for those adjacent cells overlap. For example, for NR Frequency Range 1 (FR1), SSB indices can be configured per sector such that different sectors use different SSB indices. Thus, SSB transmissions occur on different time slots and the probability of SSB interference in overlap regions decreases. Accordingly, Synchronization Signal (SS)-SINR is improved at receiving UE devices, which can improve user experience by providing improved quality across the cell coverage footprint and reducing the number of dropped calls.

Results have shown that time shifting SSBs according to the present disclosure can result in a 9 dB to 13 dB plus improvement in SS-SINR at receiving UE devices compared to conventional methods of transmitting SSBs. Also, results have shown that frequency shifting SSBs according to the present disclosure can result in a 10 dB improvement in SS-SINR at receiving UE devices compared to conventional methods of transmitting SSBs.

A method of transmitting Synchronization Signal Blocks (SSBs) in a Fifth-Generation (5G) New Radio (NR) cellular telecommunication Radio Access Network (RAN) according to the present disclosure may be characterized as including: transmitting, by a Radio Unit (RU) device, a first plurality of symbols from a first antenna in a first sector during a first time slot, where two or more of the first plurality of symbols include a first SSB; transmitting, by the RU device, a second plurality of symbols from a second antenna in a second sector during the first time slot, where two or more of the second plurality of symbols include a second SSB, and where the second sector is adjacent to the first sector; and transmitting, by the RU device, a third plurality of symbols from a third antenna in a third sector during a second time slot, where two or more of the third plurality of symbols include a third SSB, and where the third sector is adjacent to the second sector. The two or more of the first plurality of symbols that include the first SSB are transmitted during a first time period. The two or more of the second plurality of symbols that include the second SSB are transmitted during a second time period that is different from the first time period. The two or more of the third plurality of symbols that include the third SSB are transmitted during a third time period that is different from the first time period and the second time period.

The first time period, the second time period, and the third time period may not overlap in time. The two or more of the first plurality of symbols that include the first SSB may be transmitted using a first plurality of frequency resources, the two or more of the second plurality of symbols that include the second SSB may be transmitted using a second plurality of frequency resources different from the first plurality of frequency resources, and the two or more of the third plurality of symbols that include the third SSB may be transmitted using a third plurality of frequency resources different from the first plurality of frequency resources and the second plurality of frequency resources. The first plurality of frequency resources, the second plurality of frequency resources, and the third plurality of frequency resources may not overlap in frequency. The first plurality of frequency resources, the second plurality of frequency resources, and the third plurality of frequency resources may partially overlap in frequency.

The first plurality of symbols may be consecutive and the two or more of the first plurality of symbols that include the first SSB may begin at a first offset from a first one of the first plurality of symbols, the second plurality of symbols may be consecutive and the two or more of the second plurality of symbols that include the second SSB may begin at a second offset from a first one of the second plurality of symbols, the third plurality of symbols may be consecutive and the two or more of the third plurality of symbols that include the third SSB may begin at a third offset from a first one of the third plurality of symbols, a number of symbols included in the first plurality of symbols, a number of symbols included in the second plurality of symbols, and a number of symbols included in the third plurality of symbols may be a same number, and the first offset, the second offset, and the third offset may be different.

The method may further include: transmitting, by the RU device, a fourth plurality of symbols from a fourth antenna in a fourth sector during the first time slot and the second time slot, where two or more of the plurality of fourth symbols include a fourth SSB, where the fourth sector is adjacent to the third sector, and where the two or more of the fourth plurality of symbols that include the fourth SSB are transmitted during a fourth time period that is different from the first time period, the second time period, and the third time period.

A method of transmitting Synchronization Signal Blocks (SSBs) in a Fifth-Generation (5G) New Radio (NR) cellular telecommunication Radio Access Network (RAN) according to the present disclosure may be characterized as including: transmitting, by a Radio Unit (RU) device, a first plurality of symbols from a first antenna in a first sector during a first time slot and a second time slot, where two or more of the first plurality of symbols include a first SSB; transmitting, by the RU device, a second plurality of symbols from a second antenna in a second sector during the first time slot and the second time slot, where two or more of the second plurality of symbols include a second SSB, and where the second sector is adjacent to the first sector; and transmitting, by the RU device, a third plurality of symbols from a third antenna in a third sector during the first time slot and the second time slot, where two or more of the third plurality of symbols include a third SSB, and where the third sector is adjacent to the second sector. The two or more of the first plurality of symbols that include the first SSB are transmitted using a first plurality of frequency resources. The two or more of the second plurality of symbols that include the second SSB are transmitted using a second plurality of frequency resources different from the first plurality of frequency resources. The two or more of the third plurality of symbols that include the third SSB are transmitted using a third plurality of frequency resources different from the first plurality of frequency resources and the second plurality of frequency resources.

The first plurality of frequency resources, the second plurality of frequency resources, and the third plurality of frequency resources may not overlap in frequency.

The first plurality of frequency resources, the second plurality of frequency resources, and the third plurality of frequency resources may partially overlap in frequency.

The first plurality of symbols may be consecutive and the two or more of the first plurality of symbols that include the first SSB may begin at a first offset from a first one of the first plurality of symbols. The second plurality of symbols may be consecutive and the two or more of the second plurality of symbols that include the second SSB may begin at a second offset from a first one of the second plurality of symbols. The third plurality of symbols may be consecutive and the two or more of the third plurality of symbols that include the third SSB may begin at a third offset from a first one of the third plurality of symbols. A number of symbols included in the first plurality of symbols, a number of symbols included in the second plurality of symbols, and a number of symbols included in the third plurality of symbols may be a same number, and the first offset, the second offset, and the third offset may be different.

The method may further include: transmitting, by the RU device, a fourth plurality of symbols from a fourth antenna in a fourth sector during the first time slot and the second time slot, where two or more of the plurality of fourth symbols include a fourth SSB, where the fourth sector is adjacent to the third sector, and where the two or more of the fourth plurality of symbols that include the fourth SSB are transmitted using a fourth plurality of frequency resources different from the first plurality of frequency resources, the second plurality of frequency resources, and the third plurality of frequency resources.

A method of transmitting Synchronization Signal Blocks (SSBs) in a Fifth-Generation (5G) New Radio (NR) cellular telecommunication Radio Access Network (RAN) according to the present disclosure may be characterized as including: transmitting, by a Radio Unit (RU) device, a first beam including a first plurality of symbols from a first antenna in a first sector during a first time slot and a second time slot, where two or more of the first plurality of symbols include a first SSB; transmitting, by the RU device, a second beam including a second plurality of symbols from the first antenna in the first sector during the first time slot and the second time slot, where two or more of the second plurality of symbols include a second SSB; transmitting, by the RU device, a third beam including a third plurality of symbols from the first antenna in the first sector during the first time slot and the second time slot, where two or more of the third plurality of symbols include a third SSB; transmitting, by the RU device, a fourth beam including a fourth plurality of symbols from a second antenna in a second sector during the first time slot and the second time slot, where two or more of the fourth plurality of symbols include a fourth SSB, and where the second sector is adjacent to the first sector; transmitting, by the RU device, a fifth beam including a fifth plurality of symbols from the second antenna in the second sector during the first time slot and the second time slot, where two or more of the fifth plurality of symbols include a fifth SSB; transmitting, by the RU device, a sixth beam including a sixth plurality of symbols from the second antenna in the second sector during the first time slot and the second time slot, where two or more of the sixth plurality of symbols include a sixth SSB; transmitting, by the RU device, a seventh beam including a seventh plurality of symbols from a third antenna in a third sector during the first time slot and the second time slot, where two or more of the seventh plurality of symbols include a seventh SSB, and where the third sector is adjacent to the second sector; transmitting, by the RU device, an eighth beam including an eighth plurality of symbols from the third antenna in the third sector during the first time slot and the second time slot, where two or more of the eighth plurality of symbols include an eighth SSB; and transmitting, by the RU device, a ninth beam including a ninth plurality of symbols from the third antenna in the third sector during the first time slot and the second time slot, where two or more of the ninth plurality of symbols include a ninth SSB. The two or more of the first plurality of symbols that include the first SSB, the two or more of the fourth plurality of symbols that include the fourth SSB, and the two or more of the seventh plurality of symbols that include the seventh SSB are transmitted during a first time period. The two or more of the second plurality of symbols that include the second SSB, the two or more of the fifth plurality of symbols that include the fifth SSB, and the two or more of the eighth plurality of symbols that include the eighth SSB are transmitted during a second time period that is different from the first time period. The two or more of the third plurality of symbols that include the third SSB, the two or more of the sixth plurality of symbols that include the sixth SSB, and the two or more of the ninth plurality of symbols that include the ninth SSB are transmitted during a third time period that is different from the first time period and the second time period.

The first time period, the second time period, and the third time period may not overlap in time.

Information included in the first SSB may be same as information included in the second SSB, and information included in the third SSB may be same as the information included in the second SSB.

The first plurality of symbols may be consecutive and the two or more of the first plurality of symbols that include the first SSB may begin at a first offset from a first one of the first plurality of symbols, the second plurality of symbols may be consecutive and the two or more of the second plurality of symbols that include the second SSB may begin at a second offset from a first one of the second plurality of symbols, the third plurality of symbols may be consecutive and the two or more of the third plurality of symbols that include the third SSB may begin at a third offset from a first one of the third plurality of symbols, a number of symbols included in the first plurality of symbols, a number of symbols included in the second plurality of symbols, and a number of symbols included in the third plurality of symbols may be a same number, and the first offset, the second offset, and the third offset may be different.

The two or more of the first plurality of symbols that include the first SSB, the two or more of the fourth plurality of symbols that include the fourth SSB, and the two or more of the seventh plurality of symbols that include the seventh SSB may be transmitted using a first plurality of frequency resources, the two or more of the second plurality of symbols that include the second SSB, the two or more of the fifth plurality of symbols that include the fifth SSB, and the two or more of the eighth plurality of symbols that include the eighth SSB may be transmitted using a second plurality of frequency resources that is different from the first plurality of frequency resources, the two or more of the third plurality of symbols that include the third SSB, the two or more of the sixth plurality of symbols that include the sixth SSB, and the two or more of the ninth plurality of symbols that include the ninth SSB may be transmitted using a third plurality of frequency resources different from the first plurality of frequency resources and the second plurality of frequency resources.

The first plurality of frequency resources, the second plurality of frequency resources, and the third plurality of frequency resources may not overlap in frequency, or may partially overlap in frequency.

The method may further include: transmitting, by the RU device, a tenth beam including a tenth plurality of symbols from the first antenna in the first sector during the first time slot and the second time slot, where two or more of the tenth plurality of symbols include a tenth SSB; transmitting, by the RU device, an eleventh beam including an eleventh plurality of symbols from the second antenna in the second sector during the first time slot and the second time slot, where two or more of the eleventh plurality of symbols include an eleventh SSB; and transmitting, by the RU device, a twelfth beam including a twelfth plurality of symbols from the third antenna in the third sector during the first time slot and the second time slot, where two or more of the ninth plurality of symbols include a twelfth SSB, where the two or more of the tenth plurality of symbols that include the tenth SSB are transmitted during the first time period, where the two or more of the eleventh plurality of symbols that include the eleventh SSB are transmitted during the second time period, and where the two or more of the twelfth plurality of symbols that include the twelfth SSB are transmitted during the third time period.

The method may further include: transmitting, by the RU device, a tenth beam including a tenth plurality of symbols from a fourth antenna in a fourth sector during a first time slot and a second time slot, where two or more of the first plurality of symbols include a tenth SSB, and where the fourth sector is adjacent to the third sector; transmitting, by the RU device, an eleventh beam including an eleventh plurality of symbols from the fourth antenna in the fourth sector during the first time slot and the second time slot, where two or more of the eleventh plurality of symbols include an eleventh SSB; and transmitting, by the RU device, a twelfth beam including a twelfth plurality of symbols from the fourth antenna in the fourth sector during the first time slot and the second time slot, where two or more of the twelfth plurality of symbols include a twelfth SSB, where the two or more of the tenth plurality of symbols that include the tenth SSB are transmitted during the first time period, where the two or more of the eleventh plurality of symbols that include the eleventh SSB are transmitted during the second time period, and where the two or more of the twelfth plurality of symbols that include the twelfth SSB are transmitted during the third time period.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 3 is a diagram for explaining operation of a communication system in accordance with embodiments described herein.

FIG. 4 is a diagram for explaining operation of a communication system in accordance with embodiments described herein.

FIG. 5 is a diagram for explaining operation of a communication system in accordance with embodiments described herein.

DETAILED DESCRIPTION

Figure 1:
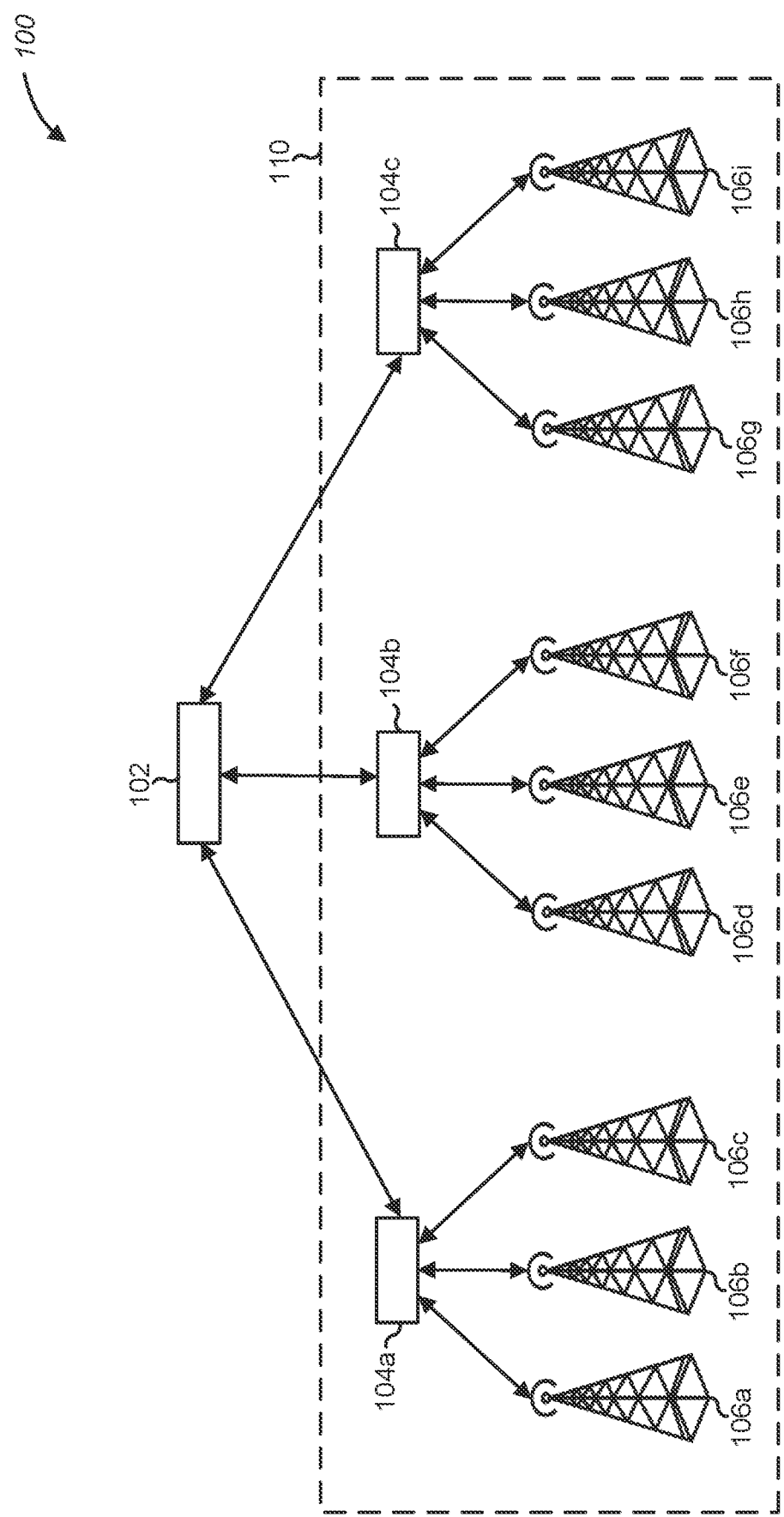
FIG. 1 is a block diagram illustrating a communication system in accordance with embodiments described herein.

FIG. 1 is a block diagram illustrating a communication system 100 in accordance with embodiments described herein. The communication system 100 includes a Centralized Unit (CU) device 102 that controls and coordinates operation of a plurality of Distributed Unit (DU) devices, including a DU device 104*a*, a DU device 104*b*, and a DU device 104*c*.

The DU device 104*a* controls and coordinates operation of a plurality of Radio Unit (RU) devices, including an RU device 106*a*, an RU device 106*b*, and an RU device 106*c*. For example, based on control information received from the CU device 102, the DU device 104*a* provides control information to the RU device 106*a*, the RU device 106*b*, and the RU device 106*c*, which causes the RU device 106*a*, the RU device 106*b*, and the RU device 106*c* to transmit Synchronization Signal Blocks (SSBs) at times or timings indicated by the control information and using frequency resources indicated by the control information.

In one or more implementations, the DU device 104*a* provides control information to the RU device 106*a*, the RU device 106*b*, and the RU device 106*c*, which cause the RU device 106a, the RU device 106b, and the RU device 106c to transmit SSBs according to 3GPP TS 38.213 V17.2.0 (2022-06) using specified Resource Elements (REs) or Physical Resource Blocks (PRBs), which are mentioned in 3GPP TS 38.211 V17.2.0 (2022-06), for example. The contents of 3GPP TS 38.211 V17.2.0 (2022-06) and 3GPP TS 38.213 V17.2.0 (2022-06) are incorporated by reference herein.

In one or more implementations, control information provided by the DU device 104a specifies frequency resources for respective SSBs, wherein there is no overlap between the frequency resources for respective SSBs. In one or more implementations, control information provided by the DU device 104a specifies frequency resources for respective SSBs, wherein there is some overlap between the frequency resources for respective SSBs. For example, for a 10 MHz system, in which 20 RBs are specified per SSB, out of 52 available RBs, there is a minimum overlap between frequency resources for respective SSBs.

The DU device 104b controls and coordinates operation of a plurality of RU devices, including an RU device 106d, an RU device 106e, and an RU device 106f. For example, based on control information received from the CU device 102, the DU device 104a provides control information to the RU device 106d, the RU device 106e, and the RU device 106f, which causes the RU device 106d, the RU device 106e, and the RU device 106f to transmit SSBs at times or timings indicated by the control information and using frequency resources indicated by the control information.

Also, the DU device 104c controls and coordinates operation of a plurality of RU devices, including an RU device 106g, an RU device 106h, and an RU device 106i. For example, based on control information received from the CU device 102, the DU device 104a provides control information to the RU device 106g, the RU device 106h, and the RU device 106i, which causes the RU device 106g, the RU device 106h, and the RU device 106i to transmit SSBs at times or timings indicated by the control information and using frequency resources indicated by the control information.

In addition, the DU device 104a, the DU device 104b, the DU device 104c, the RU device 106a, the RU device 106b, the RU device 106c, the RU device 106d, the RU device 106e, the RU device 106f, the RU device 106g, the RU device 106h, and the RU device 106i are part of a Radio Access Network (RAN) 100. In one or more implementations, the CU device 102 part of a 5G Core Network that is implemented in a public cloud environment (e.g., Amazon Web Service).

Figure 2:
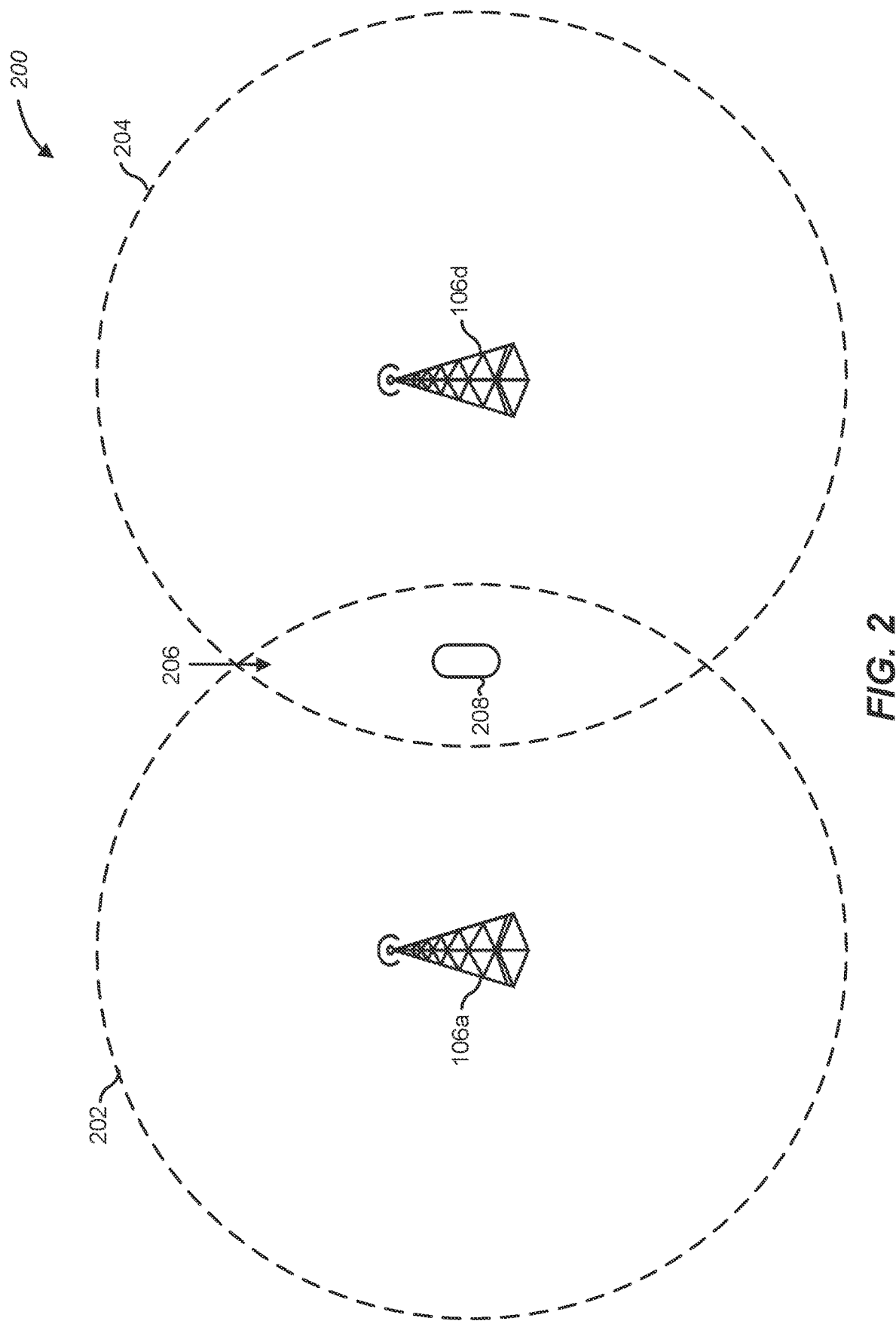
FIG. 2 is a diagram for explaining operation of a communication system in accordance with embodiments described herein.

FIG. 2 is a diagram for explaining operation of a communication system in accordance with embodiments described herein. More particularly, FIG. 2 shows an area 200 that includes a first coverage area 202 in which the RU device 106a is disposed, and a second coverage area 204 in which the RU device 106d is disposed. The first coverage area 202 and the second coverage area 204 overlap in an overlap area 206. A User Equipment (UE) device 208 is located in the overlap area 206. In one or more implementations, each of the RU device 106a and the RU device 106d are part of a 5G NR gNodeB (gNB) device (e.g., base station device).

If the RU device 106a and the RU device 106d were to simultaneously transmit SSBs using the same frequency resources (e.g., PRBs) to the UE device 208 would receive the SSBs with a low SINR. Accordingly, the RU device 106a and the RU device 106d do not simultaneously transmit SSBs using the same frequency resources (e.g., PRBs) to the UE device 208 in order to improve the SINR at which the SSBs are received at the UE device 208.

FIG. 3 is a diagram for explaining operation of a communication system in accordance with embodiments described herein. FIG. 3 shows an example of a Radio Frequency (RF) radiation pattern 300, which can be produced by each of the RU device 106a, the RU device 106b, the RU device 106c, the RU device 106d, the RU device 106e, the RU device 106f, the RU device 106g, the RU device 106h, and the RU device 106i shown in FIG. 1. FIG. 3 includes a first antenna 302, a second antenna 304, and a third antenna 306 by which one of the RU device 106a, the RU device 106b, the RU device 106c, the RU device 106d, the RU device 106e, the RU device 106f, the RU device 106g, the RU device 106h, and the RU device 106i shown in FIG. 1 transmits information, including SSBs. The first antenna 302, the second antenna 304, and the third antenna 306 are fixed and orientated such that the first antenna 302 transmits RF signals in a first sector 308, the second antenna 302 transmits RF signals in a second sector 310, and the third antenna 302 transmits RF signals in a third sector 312. Each of the first sector 308, the second sector 310, and the third sector 312 has a central angle of 120 degrees As shown in FIG. 3, the first sector 308 is adjacent to the second sector 310 and the third sector 312. Also, the second sector 310 is adjacent to the first sector 308 and the third sector 312. In addition, the third sector 312 is adjacent to the first sector 308 and the second sector 310.

The RF radiation pattern 300 is an example of one of many radiation patterns according to the present disclosure. Radiation patterns according to the present disclosure may include sectors having central angle that are bigger or smaller than 120 degrees. For example, if an additional (i.e., fourth antenna) is used, each of four resulting sectors would a central angle of 90 degrees.

FIG. 4 is a diagram for explaining operation of a communication system in accordance with embodiments described herein. FIG. 4 shows an example of a Radio Frequency (RF) radiation pattern 400, which can be produced by each of the RU device 106a, the RU device 106b, the RU device 106c, the RU device 106d, the RU device 106e, the RU device 106f, the RU device 106g, the RU device 106h, and the RU device 106i shown in FIG. 1. FIG. 4 includes a first antenna 402, a second antenna 404, and a third antenna 406 by which one of the RU device 106a, the RU device 106b, the RU device 106c, the RU device 106d, the RU device 106e, the RU device 106f, the RU device 106g, the RU device 106h, and the RU device 106i shown in FIG. 1 can transmit information, including SSBs. The first antenna 402, the second antenna 404, and the third antenna 406 are fixed and orientated such that the first antenna 402 transmits RF signals in a first sector 408, the second antenna 402 transmits RF signals in a second sector 410, and the third antenna 402 transmits RF signals in a third sector 412. Each of the first sector 408, the second sector 410, and the third sector 412 has a central angle of 120 degrees.

More particularly, the first antenna 402 uses beamforming techniques to form a first beam 414a, a second beam 414b, a third beam 414c, and a fourth beam 414d, which are transmitted in the first sector 408. Each of the first beam 414a, second beam 414b, third beam 414c, and fourth beam 414d forms a central angle of 30 degrees with an adjacent one of those beams.

The second antenna 404 uses beamforming techniques to form a first beam 416a, a second beam 416b, a third beam 416c, and a fourth beam 416d, which are transmitted in the second sector 410. Each of the first beam 416a, second beam 416b, third beam 416c, and fourth beam 416d forms a central angle of 30 degrees with an adjacent one of those beams.

The third antenna 406 uses beamforming techniques to form a first beam 418a, a second beam 418b, a third beam 418c, and a fourth beam 418d, which are transmitted in the third sector 412. Each of the first beam 418a, second beam 418b, third beam 418c, and fourth beam 418d forms a central angle of 30 degrees with an adjacent one of those beams.

Although FIG. 4 shows each of the antennas 402, 402, 404 forming four beams, the antennas 402, 402, 404 may form fewer or additional beams without departing from the scope of the present disclosure. Additionally, the RF radiation pattern 400 is an example of one of many radiation patterns according to the present disclosure. Radiation patterns according to the present disclosure may include sectors having central angle that are bigger or smaller than 120 degrees. For example, if an additional (i.e., fourth antenna) is used, each of four resulting sectors would a central angle of 90 degrees.

FIG. 5 is a diagram for explaining operation of a communication system in accordance with embodiments described herein. FIG. 5 shows an example of a transmission 500 of a plurality of symbols 502 (only one of which is labeled in FIG. 5 for illustrative simplicity). The symbols are transmitted during a first slot Slot 0 and a second slot Slot 1, each of which includes fourteen symbols, which are numbered 0 to 13 in FIG. 5. As shown in FIG. 5, a first SSB having an SSB index of 0 (i.e., SSB(0)) can be transmitted during a first time period t0 using symbols numbered 2 through 5 of the first slot Slot 0, a second SSB having an SSB index of 1 (i.e., SSB(1)) can be transmitted during a second time period t1 using symbols numbered 8 through 11 of the first slot Slot 0, a third SSB having an SSB index of 2 (i.e., SSB(2)) can be transmitted during a third time period t1 using symbols numbered 2 through 5 of the second slot Slot 1, and a fourth SSB having an SSB index of 3 (i.e., SSB(3)) can be transmitted using symbols numbered 2 through 5 of the second slot Slot 1.

In one or more implementations, an RU device (e.g., RU device 106a) causes the first antenna 302 shown in FIG. 3 to transmit the first SSB having the SSB index of 0 (i.e., SSB(0)) using symbols numbered 2 through 5 of the first slot Slot 0. Also, the RU device causes the second antenna 304 shown in FIG. 3 to transmit the second SSB having the SSB index of 1 (i.e., SSB(1)) using symbols numbered 8 through 11 of the first slot Slot 0. In addition, the RU device causes the third antenna 306 shown in FIG. 3 to transmit the third SSB having the SSB index of 2 (i.e., SSB(2)) using symbols numbered 2 through 5 of the second slot Slot 1. Thus, the SSBs transmitted by the antennas 302, 304, and 306 are transmitted at different times. In other words, the SSBs transmitted by the antennas 302, 304, and 306 are transmitted during three non-overlapping time periods (e.g., t0, t1, and t2). Accordingly, interference at a UE device (e.g., UE device 208) is reduced compared to conventional techniques in which the SSBs are transmitted at the same time.

In one or more implementations in which beamforming is not used, an RU device (e.g., RU device 106a) causes the first antenna 402 shown in FIG. 4 to transmit the SSB having the SSB index of 0 (i.e., SSB(0)) using symbols numbered 2 through 5 of the first slot Slot 0. Also, the RU device causes the second antenna 404 shown in FIG. 4 to transmit the SSB having the SSB index of 1 (i.e., SSB(1)) using symbols numbered 8 through 11 of the first slot Slot 0. In addition, the RU device causes the third antenna 406 shown in FIG. 4 to transmit the SSB having the SSB index of 2 (i.e., SSB(2)) using symbols numbered 2 through 5 of the second slot Slot 1.

Figure 6:
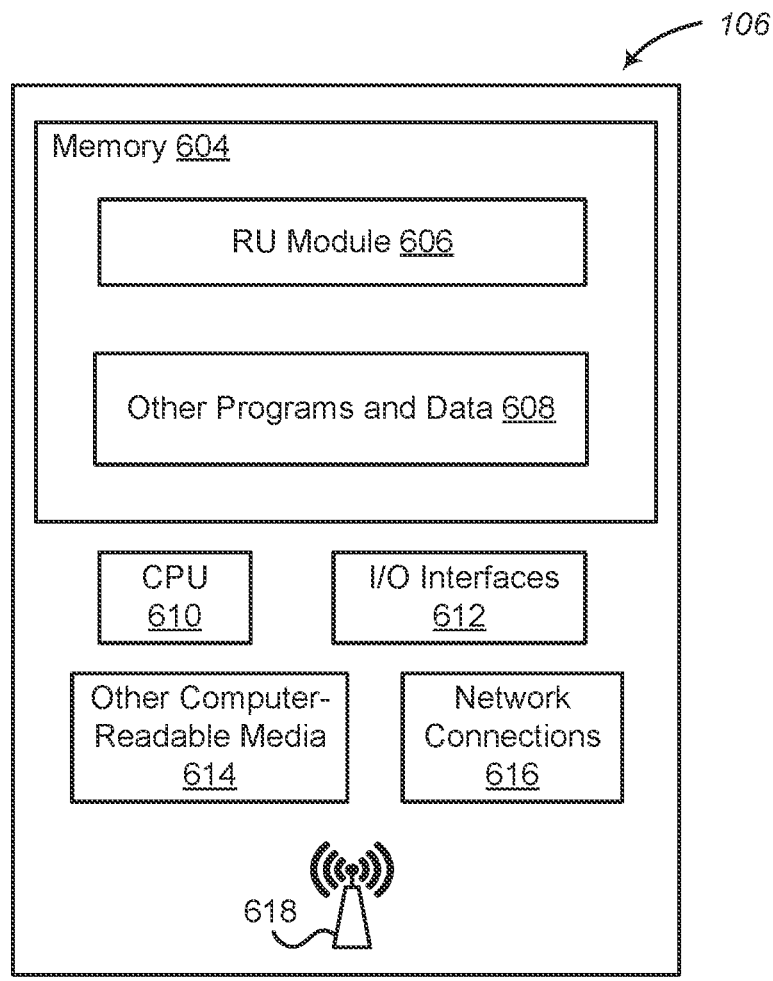
FIG. 6 is a block diagram illustrating an example of a Radio Unit (RU) device in accordance with embodiments described herein.

FIG. 6 is a block diagram illustrating an example of a Radio Unit (RU) device 106 in accordance with embodiments described herein. In some embodiments, one or more special-purpose computing systems may be used to implement the RU device 106. Accordingly, various embodiments described herein may be implemented in software, hardware, firmware, or in some combination thereof. The RU device 106 may include one or more memory devices 604, one or more central processing units (CPUs) 610, I/O interfaces 612, other computer-readable media 614, and network connections 616.

The one or more memory devices 604 may include one or more various types of non-volatile and/or volatile storage technologies. Examples of the one or more memory devices 604 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 604 may be utilized to store information, including computer-readable instructions that are utilized by the one or more CPUs 610 to perform actions, including those of embodiments described herein.

The one or more memory devices 604 may have stored thereon a Radio Unit (RU) module 606. The Radio Unit (RU) module 606 23 configured to implement and/or perform some or all of the functions of the RU device 106 described herein and interface with radio transceiver 618. The one or more memory devices 604 may also store other programs and data 608, which may include RU digital certificates, connection recovery algorithms, connection recovery rules, network protocols, O-RAN operating rules, user interfaces, operating systems, etc.

Network connections 616 are configured to communicate with other computing devices including a Distributed Unit (DU) device. In various embodiments, the network connections 616 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 612 may include enhanced Common Public Radio Interface (eCPRI) ports, Antenna Interface Standards Group (AISG) interfaces, other data input or output interfaces, or the like. Other computer-readable media 614 may include other types of stationary or removable computer-readable media, such as removable flash drives, external hard drives, or the like.

The radio transceiver 618 transmits and receives signals in the 5G NR frequency bands, including the Frequency Range 1 (FR1) bands, which includes sub-6 GHz frequency bands, and Frequency Range 2 bands, which includes frequency bands from 24.25 GHz to 71.0 GHz. In one or more implementations, the radio transceiver 618 transmits and receives information using Multiple Input Multiple Output (MIMO) radio link technology. In one or more implementations, the radio transceiver 618 includes one or more oscillators, radio frequency (RF) filters, amplifiers, beamforming circuitry, and antennas arranged to perform 5G NR communications.

Figure 7:
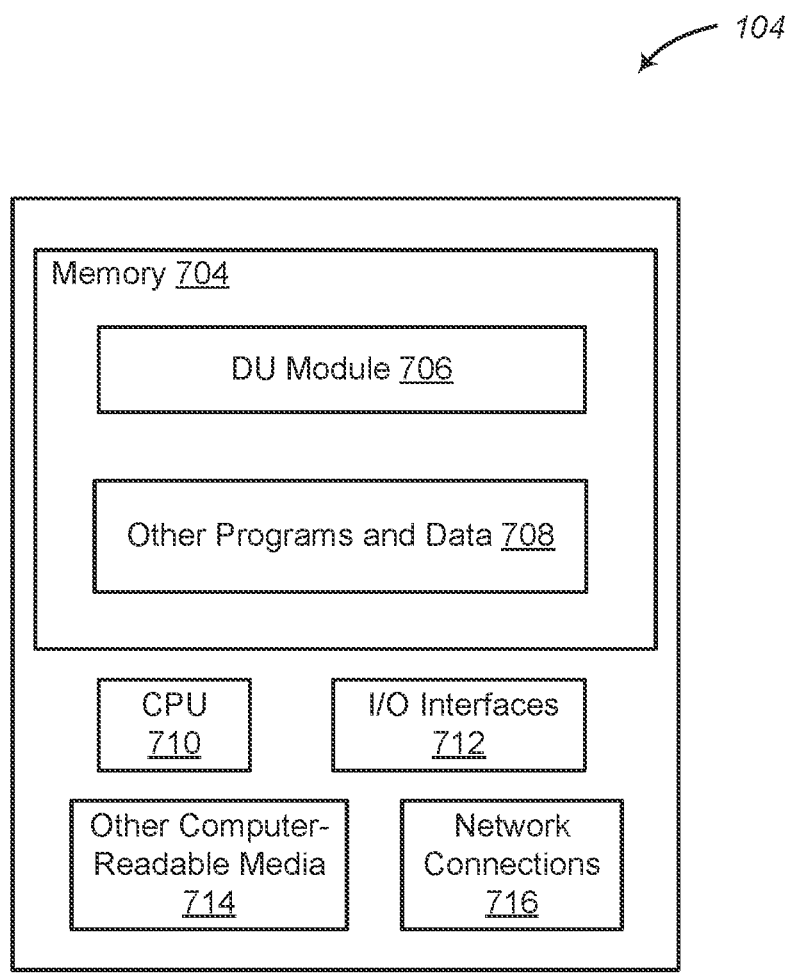
FIG. 7 is a block diagram illustrating an example of a Distributed Unit (DU) device in accordance with embodiments described herein.

FIG. 7 is a block diagram illustrating an example of a Distributed Unit (DU) device 104 in accordance with embodiments described herein. In some embodiments, one or more special-purpose computing systems may be used to implement the Distributed Unit (DU) device 104. Accordingly, various embodiments described herein may be implemented in software, hardware, firmware, or in some combination thereof. The DU device 104 may include one or more memory devices 704, one or more central processing units (CPUs) 710, I/O interfaces 712, other computer-readable media 714, and network connections 716.

The one or more memory devices 704 may include one or more various types of non-volatile and/or volatile storage technologies. Examples of the one or more memory devices 704 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 704 may be utilized to store information, including computer-readable instructions that are utilized by the one or more CPUs 710 to perform actions, including those of embodiments described herein.

The one or more memory devices 704 may have stored thereon a Distributed Unit (DU) module 706. The Distributed Unit (DU) module 706 is configured to implement and/or perform some or all of the functions of the Distributed Unit (DU) 702 described herein. The one or more memory devices 704 may also store other programs and data 708, which may include a Radio Link Control (RLC) module that implements a RLC sublayer of the 7G NR protocol stack, which interfaces to PDCP sublayer from above and MAC sublayer from below, a Media Access Control (MAC) module that implements a MAC sublayer of the 7G NR protocol stack, which interfaces to the RLC sublayer from above and a Physical (PHY) layer from below, and a PHY module that implements the PHY layer for Enhanced Mobile Broadband (eMBB) communications, Machine-Type-Communications (mMTC), and Ultra-Reliable Low Latency Communications (URLLC).

Network connections 716 are configured to communicate with other computing devices including one or more Radio Unit (RU) devices, a Centralized Unit (CU) device, and a RAN Intelligent Controller (MC) device. In various embodiments, the network connections 716 include transmitters and receivers, a layer 3 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 712 may include PCI interfaces, PCI-Express interfaces, other data input or output interfaces, or the like. Other computer-readable media 714 may include other types of stationary or removable computer-readable media, such as removable flash drives, external hard drives, or the like.

Figure 8:
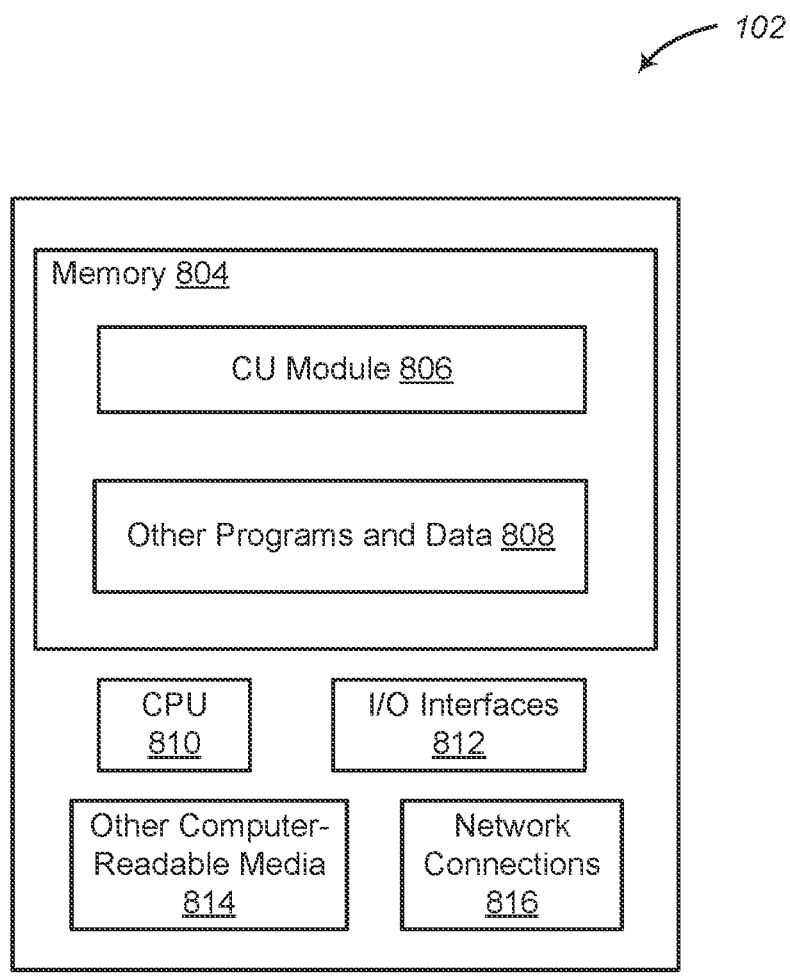
FIG. 8 is a block diagram illustrating an example of a Centralized Unit (CU) device in accordance with embodiments described herein.

FIG. 8 is a block diagram illustrating an example of a Centralized Unit (CU) device 102 in accordance with embodiments described herein. In some embodiments, one or more special-purpose computing systems may be used to implement the Centralized Unit (CU) device 102. Accordingly, various embodiments described herein may be implemented in software, hardware, firmware, or in some combination thereof. The DU device 106 may include one or more memory devices 804, one or more central processing units (CPUs) 810, I/O interfaces 812, other computer-readable media 814, and network connections 816.

The one or more memory devices 804 may include one or more various types of non-volatile and/or volatile storage technologies. Examples of the one or more memory devices 804 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 804 may be utilized to store information, including computer-readable instructions that are utilized by the one or more CPUs 810 to perform actions, including those of embodiments described herein.

The one or more memory devices 804 may have stored thereon a Centralized Unit (CU) module 806. The Centralized Unit (CU) module 806 is configured to implement and/or perform some or all of the functions of the Centralized Unit (CU) 802 described herein. The one or more memory devices 804 may also store other programs and data 808, which may include Radio Resource Control (RRC) module that implements an RRC a layer within the 5G NR protocol stack in a control plane of a gNB, a Service Data Adaptation Protocol (SDAP) module that implements a sublayer in a plane in the gNB, and a Packet Data Convergence Protocol (PDCP) module that implements a PDCP layer within the 5G NR protocol stack.

Network connections 816 are configured to communicate with other computing devices including one or more Radio Unit (RU) devices, one or more Distributed Unit (CU) devices, one or more devices that implement Access and Mobility Management Function (AMF) operations, and one or more devices that implement User Plane Function (UPF) operations. In one or more implementations, the network connections 816 includes connections made via N2, N3, F1-C, and F1-U interfaces, for example.

Figure 9:
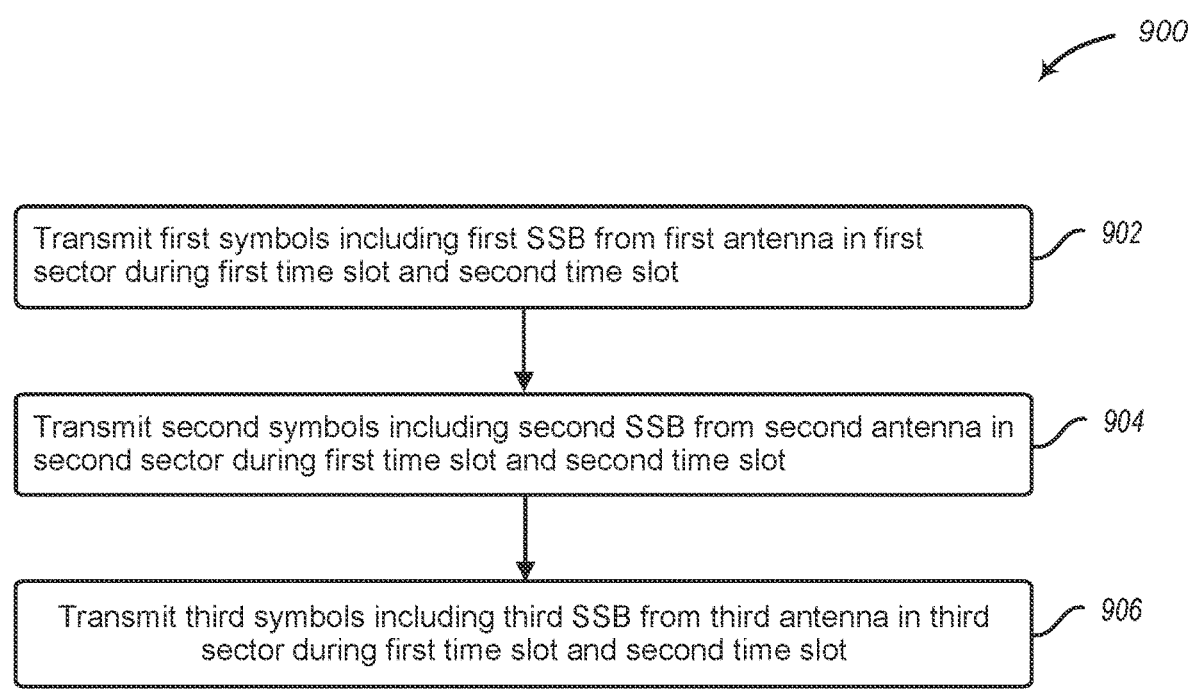
FIG. 9 illustrates a logical flow diagram showing an example of a method of operating a RU device in accordance with embodiments described herein.

FIG. 9 illustrates a logical flow diagram showing an example of a method 900 of operating an RU device in accordance with embodiments described herein. The method 900 begins at 902.

At 902, an RU device transmits a first plurality of symbols from a first antenna in a first sector during a first time slot and a second time slot, wherein two or more of the first plurality of symbols include a first SSB. For example, at 902, the RU device 106a causes the first antenna 302 to transmit a first plurality of symbols in the sector 308 shown in FIG. 3, during the first time slot Slot 0 and the second time slot Slot 1 shown in FIG. 5, wherein SSB(0) is transmitted during the first time period t0 using symbols numbered 2 to 5 of the first time slot Slot 0. The method 900 then proceeds to 904.

At 904, the RU device transmits a second plurality of symbols from a second antenna in a second sector during the first time slot and the second time slot, wherein two or more of the second plurality of symbols include a second SSB. For example, at 904, the RU device 106a causes the second antenna 304 to transmit a second plurality of symbols in the sector 310 shown in FIG. 3, during the first time slot Slot 0 and the second time slot Slot 1 shown in FIG. 5, wherein SSB(1) is transmitted during the second time period t1 using symbols numbered 8 to 11 of the first time slot Slot 0. The method 900 then proceeds to 906.

At 906, the RU device transmits a third plurality of symbols from a third antenna in a third sector during the first time slot and the second time slot, wherein two or more of the third plurality of symbols include a third SSB. For example, at 906, the RU device 106*a* causes the third antenna 306 to transmit a third plurality of symbols in the sector 312 shown in FIG. 3, during the first time slot Slot 0 and the second time slot Slot 1 shown in FIG. 5, wherein SSB(2) is transmitted during the third time period t2 using symbols numbered 2 to 5 of the second time slot Slot 1. The method 900 then ends. In one or more implementation, 902, 904, and 906 are performed simultaneously.

Figure 10:
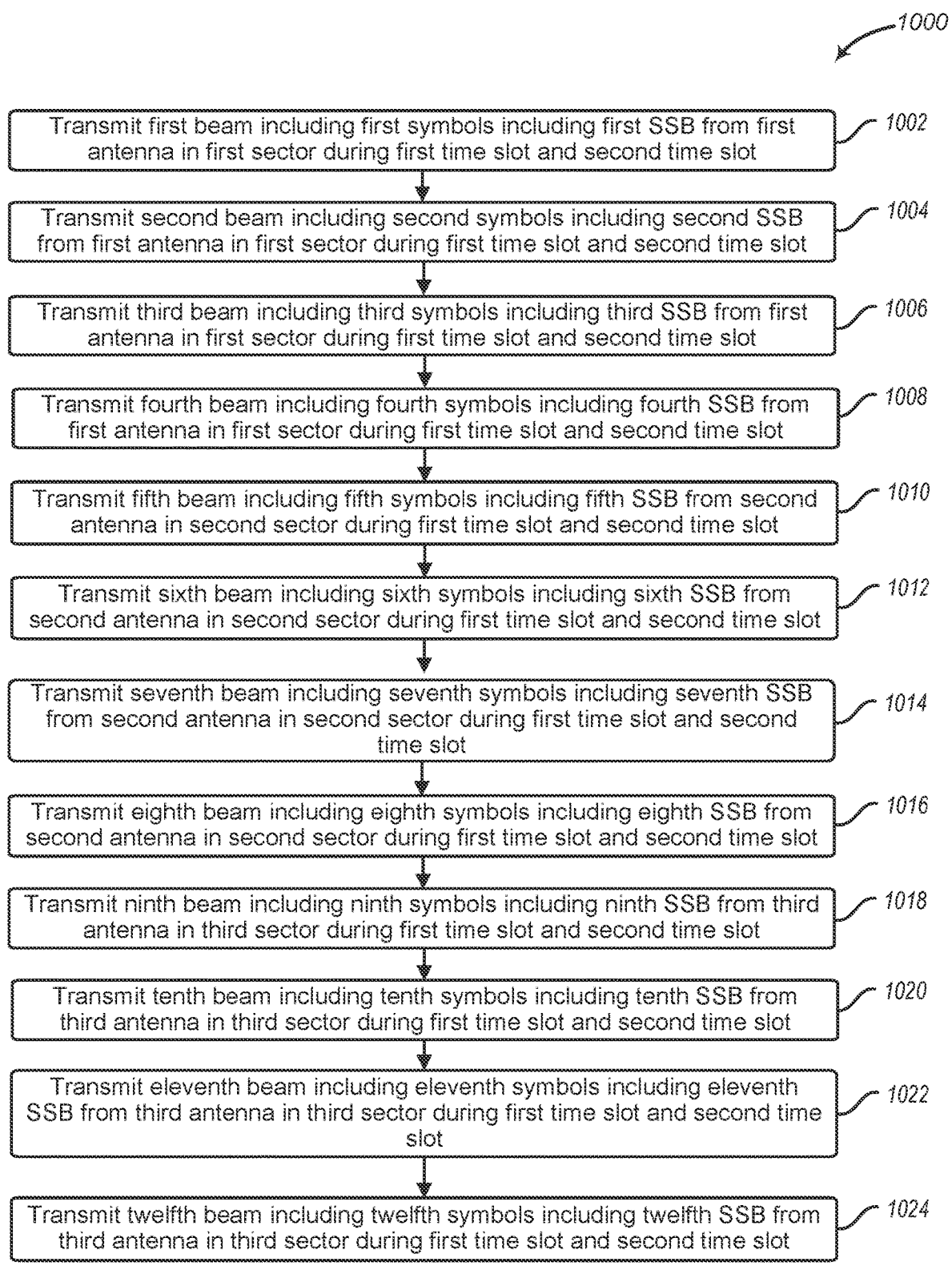
FIG. 10 illustrates a logical flow diagram showing another example of a method of operating a RU device in accordance with embodiments described herein.

FIG. 10 illustrates a logical flow diagram showing an example of a method 1000 of operating an RU device in accordance with embodiments described herein. The method begins at 1002.

At 1002, an RU device transmits a first beam including a first plurality of symbols from a first antenna in a first sector during a first time slot and a second time slot, wherein two or more of the first plurality of symbols include a first SSB. For example, at 1002, the RU device 106*a* causes the beam 414*a* to include a first plurality of symbols and be transmitted from the first antenna 402 in the sector 408 during the first time slot Slot 0 and the second time slot Slot 1 shown in FIG. 5, wherein SSB(0) is transmitted during the first time period t0 using symbols 2 to 5 of the first time slot Slot 0. The method 1000 then proceeds to 1004.

At 1004, the RU device transmits a second beam including a second plurality of symbols from the first antenna in the first sector during the first time slot and the second time slot, wherein two or more of the second plurality of symbols include a second SSB. For example, at 1004 the RU device 106*a* causes the beam 414*b* to include a second plurality of symbols and be transmitted from the first antenna 402 in the sector 408 during the first time slot Slot 0 and the second time slot Slot 1 shown in FIG. 5, wherein SSB(1) is transmitted during the second time period t1 using symbols 8 to 11 of the first time slot Slot 0. The method 1000 then proceeds to 1006.

At 1006, the RU device transmits a third beam including a third plurality of symbols from the first antenna in the first sector during the first time slot and the second time slot, wherein two or more of the third plurality of symbols include a third SSB. For example, at 1006, the RU device 106*a* causes the beam 414*c* to include a third plurality of symbols and be transmitted from the first antenna 402 in the sector 408 during the first time slot Slot 0 and the second time slot Slot 1 shown in FIG. 5, wherein SSB(2) is transmitted during the third time period t2 using symbols 2 to 5 of the second time slot Slot 1. The method 1000 then proceeds to 1008.

At 1008, the RU device transmits a fourth beam including a fourth plurality of symbols from the first antenna in the first sector during the first time slot and the second time slot, wherein two or more of the fourth plurality of symbols include a fourth SSB. For example, at 1008, the RU device 106*a* causes the beam 414*c* to include a fourth plurality of symbols and be transmitted from the first antenna 402 in the sector 408 during the first time slot Slot 0 and the second time slot Slot 1 shown in FIG. 5, wherein SSB(2) is transmitted during the fourth time period t3 using symbols 8 to 11 of the second time slot Slot 1. The method 1000 then proceeds to 1010.

At 1010, an RU device transmits a fifth beam including a fifth plurality of symbols from a second antenna in a first sector during a first time slot and a second time slot, wherein two or more of the fifth plurality of symbols include a fifth SSB. For example, at 1010, the RU device 106*a* causes the beam 416*a* to include a fifth plurality of symbols and be transmitted from the second antenna 404 in the sector 410 during the first time slot Slot 0 and the second time slot Slot 1 shown in FIG. 5, wherein SSB(0) is transmitted during the first time period t0 using symbols 2 to 5 of the first time slot Slot 0. The method 1000 then proceeds to 1012.

At 1012, the RU device transmits a sixth beam including a sixth plurality of symbols from the second antenna in the second sector during the first time slot and the second time slot, wherein two or more of the sixth plurality of symbols include a sixth SSB. For example, at 1012 the RU device 106*a* causes the beam 416*b* to include a sixth plurality of symbols and be transmitted from the second antenna 404 in the sector 410 during the first time slot Slot 0 and the second time slot Slot 1 shown in FIG. 5, wherein SSB(1) is transmitted during the second time period t1 using symbols 8 to 11 of the first time slot Slot 0. The method 1000 then proceeds to 1014.

At 1014, the RU device transmits a seventh beam including a seventh plurality of symbols from the second antenna in the second sector during the first time slot and the second time slot, wherein two or more of the seventh plurality of symbols include a seventh SSB. For example, at 1014, the RU device 106*a* causes the beam 416*c* to include a seventh plurality of symbols and be transmitted from the second antenna 404 in the sector 410 during the first time slot Slot 0 and the second time slot Slot 1 shown in FIG. 5, wherein SSB(2) is transmitted during the third time period t2 using symbols 2 to 5 of the second time slot Slot 1. The method 1000 then proceeds to 1016.

At 1016, the RU device transmits an eighth beam including an eighth plurality of symbols from the second antenna in the second sector during the first time slot and the second time slot, wherein two or more of the eighth plurality of symbols include an eighth SSB. For example, at 1016, the RU device 106*a* causes the beam 416*c* to include an eighth plurality of symbols and be transmitted from the second antenna 404 in the sector 410 during the first time slot Slot 0 and the second time slot Slot 1 shown in FIG. 5, wherein SSB(2) is transmitted during the fourth time period t3 using symbols 8 to 11 of the second time slot Slot 1. The method 1000 then proceeds to 1018.

At 1018, an RU device transmits a ninth beam including a ninth plurality of symbols from a third antenna in a third sector during a first time slot and a second time slot, wherein two or more of the ninth plurality of symbols include a ninth SSB. For example, at 1018, the RU device 106*a* causes the beam 418*a* to include a ninth plurality of symbols and be transmitted from the third antenna 406 in the sector 412 during the first time slot Slot 0 and the second time slot Slot 1 shown in FIG. 5, wherein SSB(0) is transmitted during the first time period t0 using symbols 2 to 5 of the first time slot Slot 0. The method 1000 then proceeds to 1020.

At 1020, the RU device transmits a tenth beam including a tenth plurality of symbols from the third antenna in the third sector during the first time slot and the second time slot, wherein two or more of the tenth plurality of symbols include a tenth SSB. For example, at 1020 the RU device 106*a* causes the beam 418*b* to include a tenth plurality of symbols and be transmitted from the third antenna 406 in the sector 412 during the first time slot Slot 0 and the second time slot Slot 1 shown in FIG. 5, wherein SSB(1) is transmitted during the second time period t1 using symbols 8 to 11 of the first time slot Slot 0. The method 1000 then proceeds to 1022.

At 1022, the RU device transmits an eleventh beam including an eleventh plurality of symbols from the third antenna in the third sector during the first time slot and the second time slot, wherein two or more of the eleventh plurality of symbols include an eleventh SSB. For example, at 1022, the RU device 106a causes the beam 418c to include an eleventh plurality of symbols and be transmitted from the third antenna 406 in the sector 412 during the first time slot Slot 0 and the second time slot Slot 1 shown in FIG. 5, wherein SSB(2) is transmitted during the third time period t2 using symbols 2 to 5 of the second time slot Slot 1. The method 1000 then proceeds to 1024.

At 1024, the RU device transmits a twelfth beam including a twelfth plurality of symbols from the third antenna in the third sector during the first time slot and the second time slot, wherein two or more of the twelfth plurality of symbols include a twelfth SSB. For example, at 1024, the RU device 106a causes the beam 418c to include a twelfth plurality of symbols and be transmitted from the third antenna 406 in the sector 412 during the first time slot Slot 0 and the second time slot Slot 1 shown in FIG. 5, wherein SSB(2) is transmitted during the fourth time period t3 using symbols 8 to 11 of the second time slot Slot 1. The method 1000 then ends. In one or more implementation, 1002, 1004, 1006, 1008, 1010, 1012, 1014, 1016, 1018, 1020, 1022, and 1024 are performed simultaneously.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of transmitting Synchronization Signal Blocks (SSBs) in a Fifth-Generation (5G) New Radio (NR) cellular telecommunication Radio Access Network (RAN), the method comprising:
   transmitting, by a Radio Unit (RU) device, a first plurality of symbols from a first antenna in a first sector during a first time slot, wherein two or more of the first plurality of symbols include a first SSB;
   transmitting, by the RU device, a second plurality of symbols from a second antenna in a second sector during the first time slot, wherein two or more of the second plurality of symbols include a second SSB, and wherein the second sector is adjacent to the first sector; and
   transmitting, by the RU device, a third plurality of symbols from a third antenna in a third sector during a second time slot, wherein two or more of the third plurality of symbols include a third SSB, and wherein the third sector is adjacent to the second sector, and wherein the second time slot is separate from the first time slot,
   wherein the two or more of the first plurality of symbols that include the first SSB are transmitted during a first time period within the first time slot,
   wherein the two or more of the second plurality of symbols that include the second SSB are transmitted during a second time period within the first time slot, wherein the second time period is different from the first time period, and
   wherein the two or more of the third plurality of symbols that include the third SSB are transmitted during a third time period within the second time slot, wherein the third time period is different from the first time period and the second time period.

2. The method according to claim 1, wherein:
   the first time period, the second time period, and the third time period do not overlap in time.

3. The method according to claim 2, wherein:
   wherein the two or more of the first plurality of symbols that include the first SSB are transmitted using a first plurality of frequency resources,
   wherein the two or more of the second plurality of symbols that include the second SSB are transmitted using a second plurality of frequency resources different from the first plurality of frequency resources, and
   wherein the two or more of the third plurality of symbols that include the third SSB are transmitted using a third plurality of frequency resources different from the first plurality of frequency resources and the second plurality of frequency resources.

4. The method according to claim 3, wherein:
   the first plurality of frequency resources, the second plurality of frequency resources, and the third plurality of frequency resources do not overlap in frequency.

5. The method according to claim 3, wherein:
   the first plurality of frequency resources, the second plurality of frequency resources, and the third plurality of frequency resources partially overlap in frequency.

6. The method according to claim 1, wherein:
   the first plurality of symbols are consecutive and the two or more of the first plurality of symbols that include the first SSB begin at a first offset from a first one of the first plurality of symbols,
   the second plurality of symbols are consecutive and the two or more of the second plurality of symbols that include the second SSB begin at a second offset from a first one of the second plurality of symbols,
   the third plurality of symbols are consecutive and the two or more of the third plurality of symbols that include the third SSB begin at a third offset from a first one of the third plurality of symbols,
   a number of symbols included in the first plurality of symbols, a number of symbols included in the second plurality of symbols, and a number of symbols included in the third plurality of symbols are a same number, and
   the first offset, the second offset, and the third offset are different.

7. The method according to claim 1, further comprising:
   transmitting, by the RU device, a fourth plurality of symbols from a fourth antenna in a fourth sector during the first time slot and the second time slot, wherein two or more of the plurality of fourth symbols include a fourth SSB, and wherein the fourth sector is adjacent to the third sector,
   wherein the two or more of the fourth plurality of symbols that include the fourth SSB are transmitted during a fourth time period that is different from the first time period, the second time period, and the third time period.

8. A method of transmitting Synchronization Signal Blocks (SSBs) in a Fifth-Generation (5G) New Radio (NR) cellular telecommunication Radio Access Network (RAN), the method comprising:
   transmitting, by a Radio Unit (RU) device, a first plurality of symbols from a first antenna in a first sector during a first time slot and a second time slot, wherein two or more of the first plurality of symbols include a first SSB;

transmitting, by the RU device, a second plurality of symbols from a second antenna in a second sector during the first time slot and the second time slot, wherein two or more of the second plurality of symbols include a second SSB, and wherein the second sector is adjacent to the first sector; and transmitting, by the RU device, a third plurality of symbols from a third antenna in a third sector during the first time slot and the second time slot, wherein two or more of the third plurality of symbols include a third SSB, and wherein the third sector is adjacent to the second sector, and wherein the second time slot is separate from the first time slot, wherein the two or more of the first plurality of symbols that include the first SSB are transmitted using a first plurality of frequency resources during a first time period, wherein the two or more of the second plurality of symbols that include the second SSB are transmitted using a second plurality of frequency resources during a second time period, wherein the second plurality of frequency resources are different from the first plurality of frequency resources, and wherein the two or more of the third plurality of symbols that include the third SSB are transmitted using a third plurality of frequency resources during a second time period, wherein the third plurality of frequency resources are different from the first plurality of frequency resources and the second plurality of frequency resources.

9. The method according to claim 8, wherein:

the first plurality of frequency resources, the second plurality of frequency resources, and the third plurality of frequency resources do not overlap in frequency.

10. The method according to claim 8, wherein:

the first plurality of frequency resources, the second plurality of frequency resources, and the third plurality of frequency resources partially overlap in frequency.

11. The method according to claim 8, wherein:

the first plurality of symbols are consecutive and the two or more of the first plurality of symbols that include the first SSB begin at a first offset from a first one of the first plurality of symbols, the second plurality of symbols are consecutive and the two or more of the second plurality of symbols that include the second SSB begin at a second offset from a first one of the second plurality of symbols, the third plurality of symbols are consecutive and the two or more of the third plurality of symbols that include the third SSB begin at a third offset from a first one of the third plurality of symbols, a number of symbols included in the first plurality of symbols, a number of symbols included in the second plurality of symbols, and a number of symbols included in the third plurality of symbols are a same number, and the first offset, the second offset, and the third offset are different.

12. The method according to claim 8, further comprising:

transmitting, by the RU device, a fourth plurality of symbols from a fourth antenna in a fourth sector during the first time slot and the second time slot, wherein two or more of the plurality of fourth symbols include a fourth SSB, and wherein the fourth sector is adjacent to the third sector, wherein the two or more of the fourth plurality of symbols that include the fourth SSB are transmitted using a fourth plurality of frequency resources different from the first plurality of frequency resources, the second plurality of frequency resources, and the third plurality of frequency resources.

* * * * *